United States Patent [19]

Westcott et al.

[11] Patent Number: 5,151,981
[45] Date of Patent: Sep. 29, 1992

[54] INSTRUCTION SAMPLING INSTRUMENTATION

[75] Inventors: Douglas W. Westcott, Rhinebeck; Valerie White, Poughkeepsie, both of N.Y.

[73] Assignee: International Business Machines Corporation, Armonk, N.Y.

[21] Appl. No.: 552,389

[22] Filed: Jul. 13, 1990

[51] Int. Cl.$^5$ .................. G06F 11/30; G06F 9/34
[52] U.S. Cl. .................. 395/375; 371/19; 364/DIG. 1; 364/262.4; 364/262.9; 364/264; 364/265.6
[58] Field of Search ............. 395/375, 775; 371/19

[56] References Cited

U.S. PATENT DOCUMENTS

| 3,736,566 | 5/1973 | Anderson et al. | 340/172.5 |
|---|---|---|---|
| 3,771,138 | 11/1973 | Celtruda et al. | 340/172.5 |
| 4,590,550 | 5/1986 | Eilert et al. | 364/200 |
| 4,598,364 | 7/1986 | Gum et al. | 364/300 |
| 4,707,834 | 11/1987 | Frisch et al. | 371/200 |
| 4,722,049 | 1/1988 | Lahti | 395/375 |
| 4,821,178 | 4/1989 | Levin et al. | 364/200 |
| 4,879,646 | 11/1989 | Iwasaki et al. | 395/375 |
| 4,991,090 | 2/1991 | Emma et al. | 395/375 |

OTHER PUBLICATIONS

IBM Technical Disclosure Bulletin, vol. 26, No. 3B, Aug. 1983, entitled "High-Speed Attachment for Data Collection", by C. P. Geer et al, pp. 1703–1708.
IBM Technical Disclosure Bulletin, vol. 25, No. 9, Feb. 1983, entitled "Mechanism for Managing Tables . . . Recording" by A. Levin, et al, pp. 4527–4528.
IBM Technical Disclosure Bulletin, vol. 24, No. 3, Aug. 1981, entitled "Large System Performance Monitor" by D. E. Allen et al, pp. 1416–1419.

Primary Examiner—Michael R. Fleming
Assistant Examiner—Debra A. Chun
Attorney, Agent, or Firm—Richard M. Ludwin; Floyd A. Gonzalez

[57] ABSTRACT

A system and method for instrumenting the execution of instructions in an out-of-sequence execution machine. Instructions tagged with a preselected instruction identification number (IID) are identified. When an instruction having the preselected IID is encountered, information associated with that instruction is saved as the out-of-sequence execution proceeds. If the instruction completes, the information is stored as a single instrumentation entry in a memory array. If the instruction does not complete, the information is disposed of. The process id repeated for each instruction having the preselected IID until the memory array is full. The storage of instruction information in the memory can be further conditioned on the occurrence of a cache miss or other system conditions.

7 Claims, 6 Drawing Sheets

INSTRUCTION SAMPLING INSTRUMENTATION

BACKGROUND OF THE INVENTION

1. Field of the Invention

This invention relates to instrumentation and monitoring in digital computers. More specifically, this invention relates to instrumentation and monitoring of processors that can execute instructions in an out-of-sequence fashion.

2. Related Art

Instrumentation in large processors conventionally includes the collection of information associated with an executed CPU instruction stream. The data collected is used to identify the significant instruction stream bottlenecks so that the program data structures or the instruction stream itself can be tuned to the cache and machine structures. Instrumentation data can be used, for example, to identify and fix performance problems in computer operating systems.

An example of processor instrumentation (also conventionally referred to as a monitor or monitoring system) can be seen in U.S. Pat. No. 4,590,550 to Eilert et al (the Eilert patent) which is assigned to the same assignee as the present invention. The Eilert patent discloses an internally distributed hardware/software monitor for a data processing system. The monitor of the Eilert patent collects hardware signals in a plurality of instrumentation table units (ITUs) distributed within various hardware entities in the system. The collected hardware signals are related to software controlled trace entries made in a trace table. The monitor of the Eilert patent uses a time sampling method whereby machine signals are recorded in synchronism with a time driven (periodic) sampling pulse.

The time driven sampling pulse of the Eilert patent is well suited for the monitoring of machine signals which occur frequently or periodically. Some machine signals, however, are not frequent or periodic. This is particularly true of machine signals that are indicative of system events. System events can occur at infrequently and at irregular intervals of time. Since the periodic sampling pulse of the Eilert patent may not occur during the event of interest, occurrences of the event can be missed and/or superfluous data can be recorded.

An improvement to the monitor of the Eilert patent is disclosed in U.S. Pat. No. 4,821,178 to Levin et al. (the Levin patent) which is assigned to the same assignee as the present invention. In the monitoring system of the Levin patent, event driven sampling is provided as an alternative instrumentation mode for operation within the general ITU structure disclosed in the Eilert patent. Event driven sampling provides a sampling pulse only when a selected event occurs. The event driven sampling of the Levin patent enables the monitoring of machine signals based on irregularly occurring events.

While the instrumentation units of the Levin and Eilert patents are well suited to the task of monitoring most conventional CPUs, monitoring the execution of instructions in out-of-sequence processors is problematic. In the instrumentation of the Eilert and Levin patents, monitored machine signals can be directly read out of hardware latches and placed into an instrumentation array. In processors that execute instructions sequentially, this technique is appropriate since a natural correspondence (related to time of execution for example) can be maintained between the data stored in the array and a completed instruction of interest. In processors where instructions are executed out-of-sequence, the correspondence between completed instructions and generated machine signals is more difficult to ascertain.

The problems associated with the monitoring of machine signals in out-of-sequence CPUs will be more apparent through a brief overview of conventional out-of-sequence instruction processing. In out of sequence instruction processing, the machine (i.e., the CPU or Central Processor) decodes each of a series of instructions in pipelined fashion, then starts executing them. Often, a succeeding instruction will be executed before a preceding instruction. As each instruction finishes execution it goes into a queue where it is completed in sequence even though it may have been executed out-of-sequence in the machine. Since the machine is fetching, decoding and executing instructions prior to completing the instruction stream for the previous instructions, some of the fetched, decoded, and executed instructions may be thrown away due to the previous instructions which completed, or due to interrupts in the instruction stream. Also in the machine at completion time, the information about what type of instruction was executed has been written over.

Out-of-sequence processing presents a problem to instrumentation users because conventional instrumentation is typically not provided with the means to maintain a correspondence between completed instructions and generated machine signals in such an environment. Instrumentation users are generally interested in machine signals associated with a completed instruction. In out-of-sequence processing, however, a number of instructions typically do not complete even though their execution generates machine signals and may generate system events. Thus, conventional instrumentation may collect a significant amount of data related to instructions which never complete. Further, since the CPU does not maintain a natural correspondence between completed instructions and the machine signals that they generate, merely capturing monitored signals during execution will not provide an instrumentation user with sufficient information to make many significant performance judgements.

Figure 1:
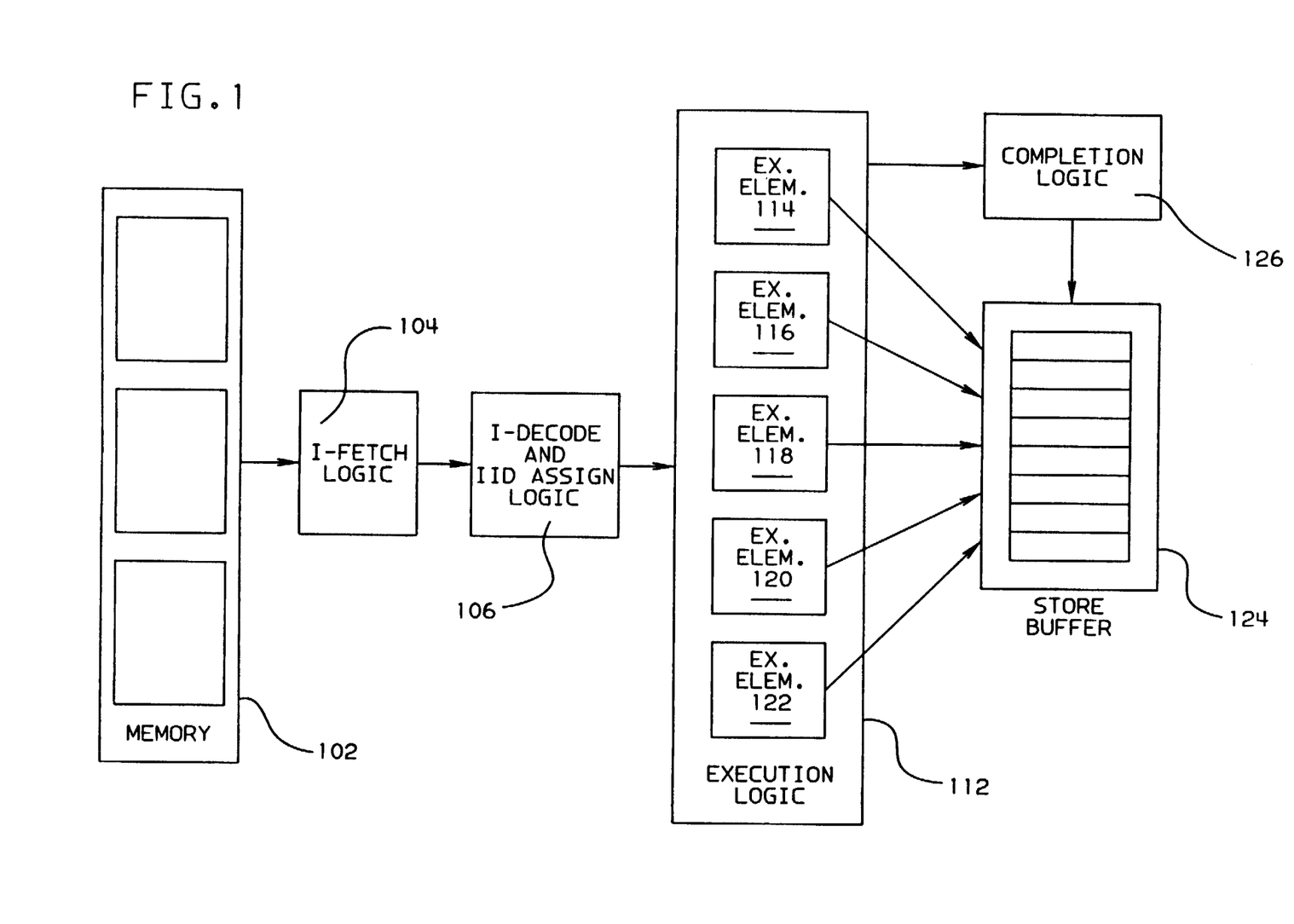
FIG. 1 is a block diagram example of out-of-sequence execution.

The out-of-sequence processing environment will be better understood by reference to FIG. 1. In the machine of FIG. 1, instructions forming a computer program are stored in a system memory 102. In order to accomplish execution, each instruction is fetched (at block 104), in logical order, in accord with a memory address provided by the CPU. By "logical order" it is meant that the instructions are fetched, from memory, in the order in which the programmer intended them to complete.

After an instruction is fetched, it is decoded (at block 106) based on an Op Code embedded in the instruction. The Op Code identifies what type of instruction has been encountered (e.g. branch, load register, store, etc.). Once decoded, the Op Code information is no longer needed by the CPU in Op Code format. Machine level commands are generated from the Op Code, and the Op Code information is written over by the next instruction. Only a machine level set of instructions remains. The CPU does not maintain correspondence between the executed machine level instructions and the original Op Code.

At decode time, a sequential instruction identity number (IID) is assigned to each instruction (at block 106).

The IIDs are assigned on a rotating basis. In other words, the series of IIDs assigned will run, for example, from 1 through 32. The first instruction fetched is assigned IID 1. The next instruction fetched is assigned IID 2. The third instruction fetched is assigned IID 3. The 32nd instruction fetched is assigned IID 32. The 33rd instruction fetched is assigned IID 1 again, and so on.

After being assigned (i.e. tagged with) an IID the instruction is executed (at block 112). Each instruction is sent to an execution element. There are multiple execution elements 114–122 in each CPU. The execution elements operate in parallel, each processing instructions independently of the other. Instructions waiting to execute are queued up in an execution element queue until an execution element completes execution of the previous instruction.

Different instructions will often take a different number of machine cycles to execute. As a consequence of differences in execution time, the execution elements often finish execution of the instructions in an order other than that in which they were fetched. This is referred to as out-of-sequence execution.

The fact that an instruction has finished execution does not ensure that the results of its execution will be valid. For example, a branch-on-condition instruction could be fetched before a store-in-register instruction which followed in memory 102. The store-in-register would be sent to a first execution element (e.g. block 114), while the branch-on-condition would be sent to a second execution element (e.g. block 116).

In the above example, the store-in-register would finish execution before the branch. The CPU, however, would not yet have determined if the branch conditions were met because the branch would still be in the process of being executed. If the branch was actually taken, the store-in-register results would never be used (i.e. they would be invalid) because the program counter would jump to another part of the program as a result of the branch. Thus, the results of the store-in-register would be invalid.

The point at which it is determined that the results of execution are valid is referred to as "completion". The "completion" or "non-completion" of instructions is determined by the completion logic 126. As each instruction finishes execution, the results are stored in store buffer 124. As each execution element finishes execution of an instruction it informs the completion logic 126. The completion logic 126 keeps track of the last instruction to complete and the subsequently fetched instructions which have finished execution but have not completed. When it is determined that the execution will, in fact, be valid the completion logic indicates that the instruction has completed by asserting an IID N complete signal (where N is and IID number).

In the above example, upon being informed by an execution element that the branch was taken, the completion logic 126 would mark the store buffer locations holding the results of the store-in-register, invalid and the processing of the instruction stream would continue. If the branch were not taken in the above example, the completion logic 126 would update the memory 102 or CPU internal registers with the content of the store buffer 124 for the completed instruction and signal other processing elements to indicate that the instruction had completed.

Out-of-sequence instruction execution presents problems to instrumentation users. Instrumentation users are interested in the completed instruction stream. Due to the out of sequence processing, however, the information that they need (e.g. the original Op Code, cache miss status, and other system event data) is often no longer resident in the machine by the time an instruction of interest completes. Further, since conventional instrumentation is typically not suited to maintain a correspondence between a completed instruction and the machine signals it generates, the user is left without the ability to tie cache misses and other system events to the completed instruction that caused them.

CROSS REFERENCES

U.S. Pat. No. 4,590,550 to Eilert, entitled INTERNALLY DISTRIBUTED MONITORING SYSTEM (issued May 20, 1986), and PERFORMANCE MONITORING BY EVENT SAMPLING (issued Apr. 11, 1989), both of which are assigned to the same assignee as the present invention, are incorporated by reference herein as if printed in full below.

SUMMARY OF THE INVENTION

It is an object of the invention to monitor instruction processing in out-of-sequence execution machines in a manner that maintains correspondence between the monitored data and a completed instruction of interest.

It is a further object of the invention to tie cache misses and other system events in out of sequence execution machines, to particular instructions in the operating system code.

It is a further object of the invention to enable programmers to study the execution of operating system modules in out-of-sequence execution machines so as to better understand factors that effect the performance of the operating system.

The foregoing objects are achieved through a system and method of instruction sampling. In instruction sampling, instructions tagged with a preselected instruction identity number (IID) are identified by the instrumentation. When an instruction having the preselected IID is encountered, information associated with that instruction is captured as the out-of-sequence execution proceeds. If the instruction completes, the captured information is stored as a single instrumentation entry in a memory array.

Advantageously, in the preferred embodiment, instruction sampling is combined with the event-driven sampling of U.S. Pat. No. 4,821,178 (the Levin patent). This event-driven instruction sampling provides operating system instrumentation the ability to tie cache misses and other system events to particular instructions in the operating system and application code. The cache miss ratio of each operating system module can be studied to better understand performance of the operating system.

DETAILED DESCRIPTION OF THE PREFERRED EMBODIMENTS

1. Overview

Instruction Sampling provides a system and method for monitoring the processing of instructions in an out-of-sequence execution machine. Each of a sequence of instructions in the execution pipeline of an out-of-sequence execution machine is tagged with an Instruction Identity number (IID). In accordance with the preferred embodiment of instruction sampling, the CPU instrumentation identifies instructions tagged with an IID 24 (hereinafter IID 24 instructions). When an an IID 24 cache hit/miss data and other information of interest instruction is encountered, the Op Code, execution data, associated with that instruction is captured in a plurality of registers distributed throughout the Central Processor (CPU).

As the information of interest is captured, the instrumentation monitors the CPU to determine if the encountered IID 24 instruction has completed execution. If the encountered IID 24 instruction completes and meets user selected trigger conditions, the captured information associated with that instruction is stored in an instrumentation array as a single instrumentation entry. If the encountered IID 24 instruction does not complete, or does not meet the trigger conditions, then the data associated with the next encountered IID 24 instruction is captured in the registers. The above process is repeated for each encountered IID 24 instruction until terminated by the system, instrumentation program, or user.

Figure 2:
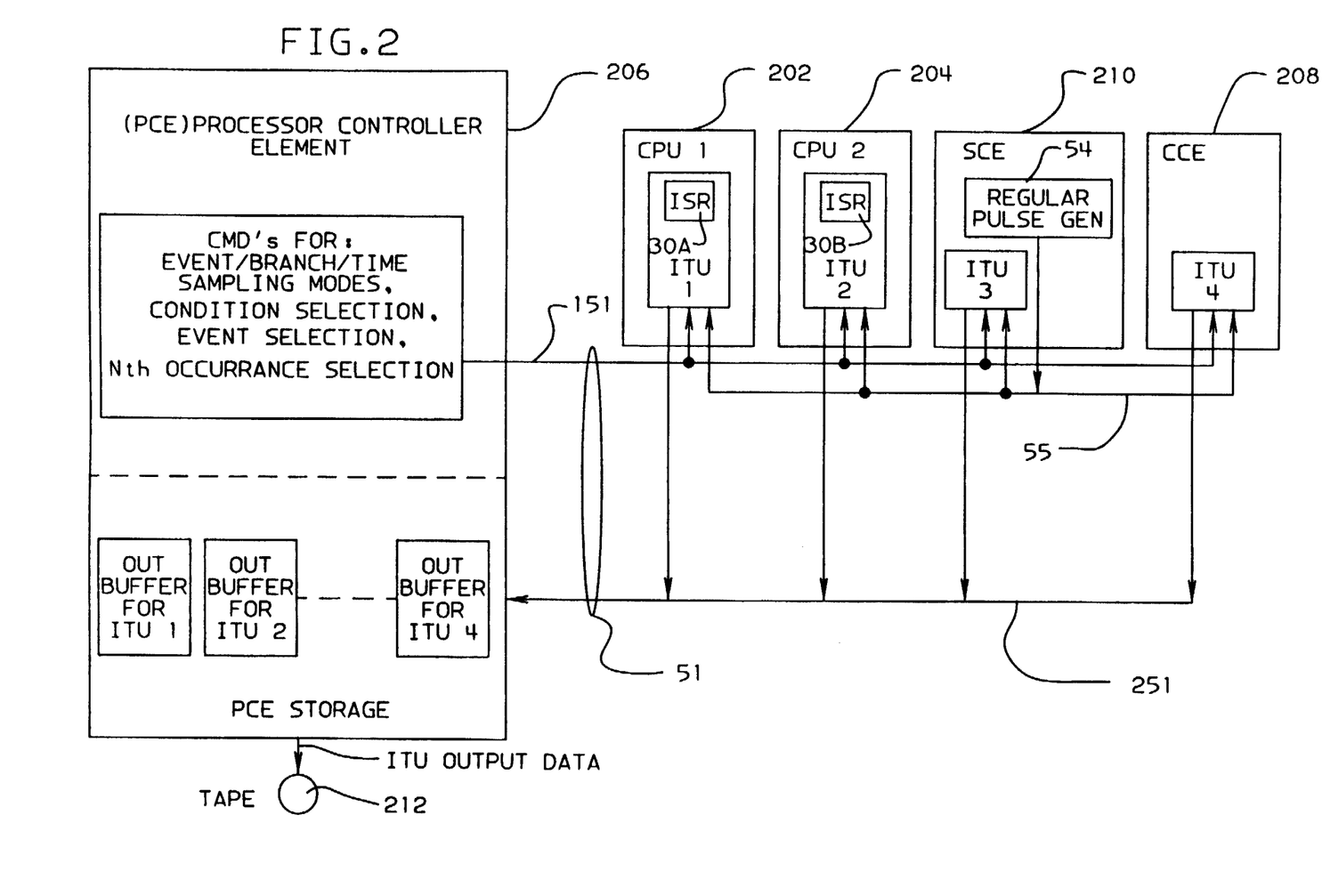
FIG. 2 is a block diagram of a data processing system containing the invention.
Figure 3:
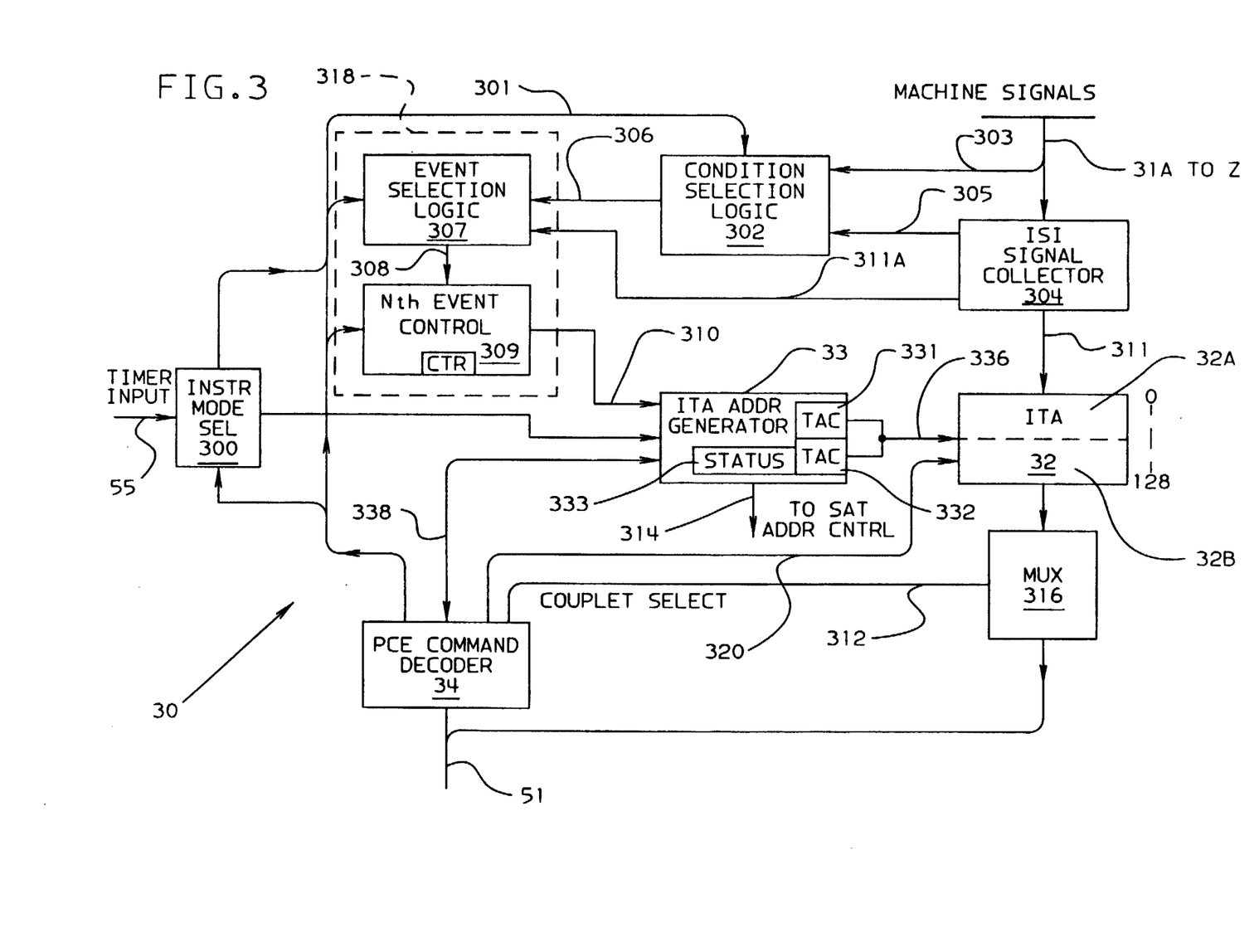
FIG. 3 is a block diagram of an embodiment of the invention in an ITU in any CPU of FIG. 1.

The application of instruction sampling to CPU instrumentation will be better understood by reference to FIG. 3. During the processing of instructions, machine signals 31 A to Z are generated by an out-of-sequence type CPU. As they are generated, machine signals associated with the execution of each IID 24 instruction are identified and captured (collected) in a signal collector 304. On each sampling pulse generated by the sampling pulse trigger logic 318, the data captured in the signal collector 304 is written as an entry into an instrumentation table array 32 under control of an address generator 33. The data in the instrumentation table array 32 can be selectively output to storage (e.g. magnetic tape 212) via a MUX 316 on command of a processor controller element 206 (FIG. 2).

The sampling pulse trigger logic 318 includes the event selection logic 307 and the Nth event control logic 309. The event selection logic receives selected system condition signals from the condition selection logic 302 and system event related machine signals from the CPU and the signal collector 304. The event selection logic 307 includes circuitry for logically combining the system event and condition signals.

In the event selection logic, an operator selected event is used as a basis for producing the sampling pulse. The operator selected event can be a system event alone or a system event in logical combination with a system condition (i.e. a conditioned event). Production of the sampling pulse is conditioned on the Nth occurrence of the selected event as determined by a preselected value in the Nth event control logic 309. After the Nth event control logic has reached the preselected count, on the first IID 24 instruction to complete during the occurrence of the selected event, a sampling pulse will be generated on line 310.

2. System Environment and Interconnection

The system environment and interconnection of instruction sampling instrumentation will be explained by reference to FIG. 2. FIG. 2 shows a multiprocessor (MP). It provides an instrumentation table unit (ITU) internally in each of its out-of-sequence type CPU's 202, 204. Also provided are a processor controller element (PCE) 206, a channel control element (CCE) 208 and a system controller element (SCE) 210. The PCE 206 (referred to as a PC in the Eilert patent) and SCE 210 are of the types shown in U.S. Pat. Nos. 4,590,550 and 4,821,178. The CCE 208 is a conventional channel control system of the type used in IBM system 370 computers. A command path 151 is shown linking the ITU's to the PCE.

The PCE is associated with a system operator console from which control over the ITU subsystem is provided. All ITU output buffers reside in the PCE. The output buffers are filled from the ITUs by data transfers on path 51. When filled, each output buffer is written to an output medium 212 (e.g. tape or disk) under control of a PCE ITU output program. The PCE ITU output program also controls the transfers on path 251 of ITU data into the buffers from the respective ITU arrays. Paths 151 and 251 are encompassed in a bidirectional PCE bus 51.

Another function of the PCE, in support of instrumentation, is to initialize and terminate measurement runs, based on user inputs. The command structure and logic for starting and stopping a measurement run is of the type found in the prior art and is not a part of this invention.

FIG. 2 includes the overall instrumentation structure by showing the preferred embodiment as an event-driven instruction sampling recorder (ISR) 30A, 30B within each ITU. The ITUs also include the time-driven embodiment of U.S. Pat. No. 4,590,550 and the branch mode sampling of U.S. Pat. No. 4,821,178. Other types of sampling recorders can also be included in the ITUs as alternatives to instruction sampling. The ITUs in the non-CPU elements, SCE and CCE, are not shown as using the invention. These elements use time-driven sampling rather than instruction sampling.

The ITU of the present invention is part of an internally distributed monitoring system such as that disclosed in U.S. Pat. No. 4,590,550.

3. Detailed Structure and Operation

Instruction Sampling Instrumentation will be explained in detail by reference to FIGS. 2 through 5. The blocks shown in FIG. 3 represent logic functions performed by circuits and microcode. These blocks preferably are not physical packaging entities. Elements of FIG. 3 which perform similar functions to elements in U.S. Pat. No. 4,590,550 have been assigned like reference numerals.

Measurement and control is provided from a PCE console where a user issues instrumentation commands and enters desired measurement characteristics, e.g., in an appropriate menu on a console display screen. The use of menus to select commands is well known in the computer arts. In FIG. 2, the command parameters are transmitted on path 151 to any selected ITU by a command. The selected ITU receives and decodes the command in the PCE command decoder 34 and outputs command signals to blocks 300, 302, 304, 307, 309 and 316 in which they set appropriate latches in accordance with the decoded command signals.

The user can also make measurement command selections not solely related to instruction sampling, such as how to start and stop the instrumentation run. These command selections can be retained in a program on the PCE.

3.1 Sampling Mode Selection Block

Selection of the sampling mode is accomplished by setting the mode in the instrumentation mode selection block 300. Any of a variety of instrumentation sampling modes (e.g. time sampling, branch sampling, instruction sampling, etc.) can be selected with respect to CPU instrumentation. Only instruction sampling mode is pertinent to the present invention.

3.2 ISI Signal Collector

The ISI signal collector identifies each IID 24 instruction processed by the instrumented CPU and captures machine signals associated with the identified IID 24 instruction as it is proceeds through the various stages of execution.

A number of signals can be captured in association with the IID 24 instruction. The individual events each have a latch or register in block 304, in which the signal is collected as it happens during processing of an IID 24 instruction (by CPU processing elements). The events and other machine signals of interest are captured in a register set in the ISI signal collector 304. In the preferred embodiment, the instrumentation registers are physically distributed throughout the CPU so as to be located near the source of the signals of interest.

Figure 4:
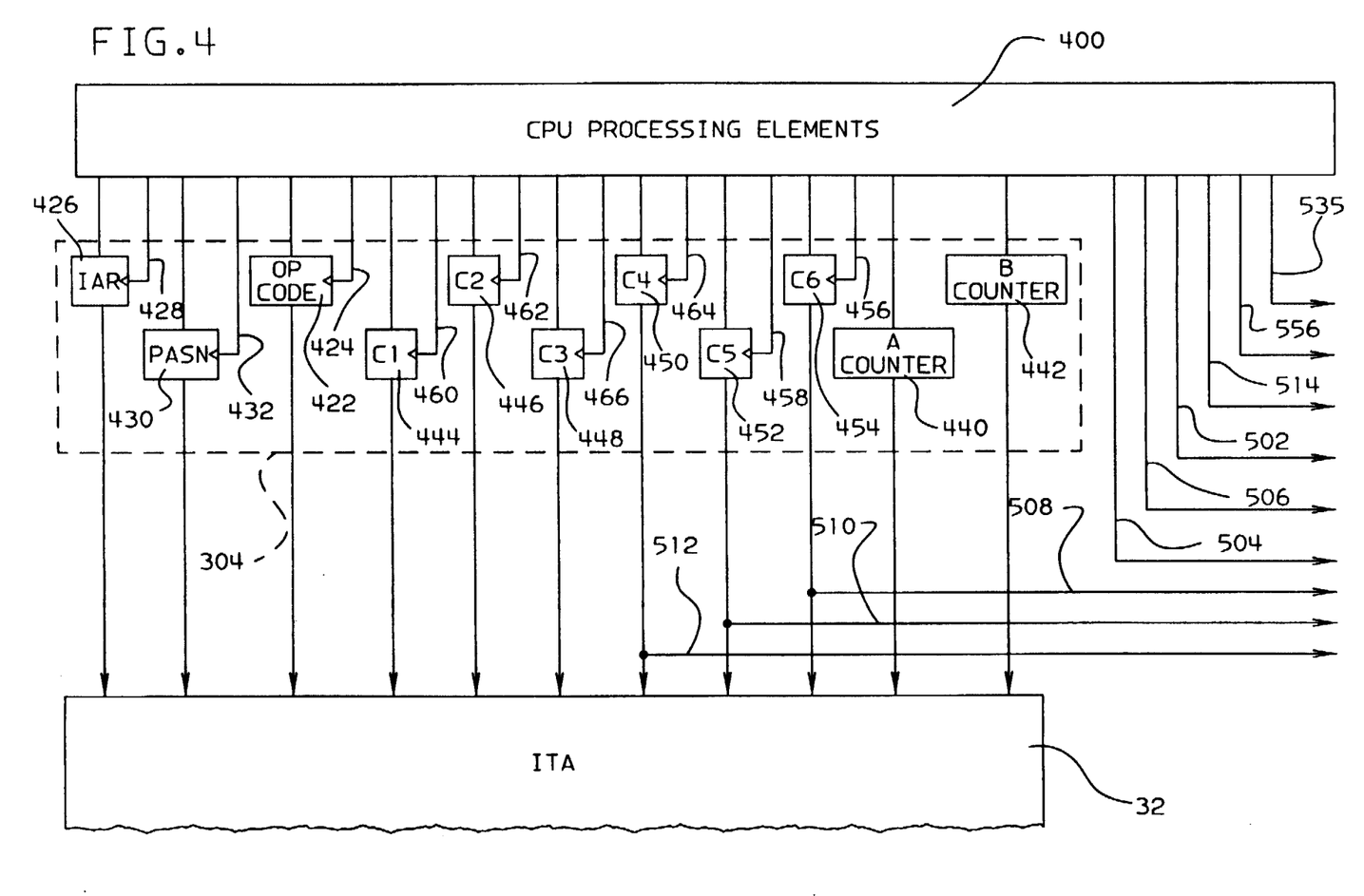
FIG. 4 is a more detailed diagram of the ISI signal collector of FIG. 3.

The ISI signal collector 304 is shown in detail in FIG. 4. The CPU processing elements 400 are the instruction processing logic of an out-of-sequence CPU of the type described in the related art section of this application. The captured signals preferably include the Op. Code and base registers, logical address, primary address space number (PASN), cache misses, caused cross interrogate hit and selected machine cycle counts from the CPU.

The Op Code and base register information is captured in the Op Code register 422. In order to insure that only the Op Code associated with IID 24 instructions are captured, the Op Code register 422 is clocked by the IID 24 Op Code valid signal on line 424. The IID 24 Op Code valid signal is generated by the Central Processor when the instruction decode and IID assignment logic (block 106; FIG. 1) determines that a valid Op Code has been encountered in an IID 24 instruction. The base register bits of the instruction, bits are valid only if the instruction uses those bits. Otherwise the base register bits are invalid.

The contents of the Central Processor's instruction address register (the logical address) are captured in the address register 426. In order to insure that only the valid instruction addresses associated with IID 24 instructions are captured, the address register 426 is clocked by the IID 24 IAR valid signal on line 428. The IID 24 IAR valid signal 428 is generated by the instruction fetch logic 104 (FIG. 1), when it determines that it has been provided with a valid instruction address on an IID 24.

The program address space number (PASN) is captured in the PASN register 430. In order to insure that only the PASN associated with IID 24 instructions are captured, the PASN register is clocked by the IID 24 PASN valid signal on line 432. The IID 24 PASN valid signal is generated by the instruction fetch logic (block 104; FIG. 1), when it determines that it has been provided with a PASN on an IID 24.

The instrumentation "A" Counter 440 is clocked by the CPU processing elements 400 to count either 1. I Decode to Finish Count, or
2. Execution Cycles taken In the preferred embodiment only one or the other is selected for instrumentation. The CPU selects which machine cycles to count based on the value in a counter A selection register (not shown) in block 300 by the PCE. The "A" counter is reset to zero by the IID 24 decode signal.

The I decode to Finish count is the number of machine cycles taken between the completion of the IID 24 instruction decode (block 106, FIG. 1) and the end of the execution cycle (block 112, FIG. 1). It does not include the machine cycles taken between the end of execution and instruction completion.

Execution cycles taken is the number of machine cycles for the IID 24 instruction to be executed in an execution element (blocks 114–122, FIG. 1). It does not include the machine cycles taken between the end of execution and instruction completion nor does it include execution queue wait time.

The Instrumentation "B" Counter 442 is clocked by the CPU Processing Elements 400 to count either 1. I Decode to Complete Count, or
2. Execution Cycles taken minus cache wait cycles In the preferred embodiment only one or the other is selected for instrumentation. The CPU selects which machine cycles to count based on the value in a counter B selection register (not shown) in block 300 by the PCE. The "B" counter is reset to zero by the IID 24 decode signal.

The I decode to complete count is the number of machine cycles taken between the start of the completion of the IID 24 instruction decode (block 106, FIG. 1) and the determination of instruction completion (block 126, FIG. 1).

Execution cycles taken minus cache wait cycles is the number of machine cycles for the IID 24 instruction to be executed in an execution element (blocks 114–122, FIG. 1). It does not include the machine cycles taken between the end of execution and instruction completion, execution queue wait time, and any cycles the execution element is waiting for data to return from the caches.

Execution cycles taken is a measure of the hardware performance. The other counted measures are an indication how well the program is matched to the out of order execution methods of a given processor. These measures can be used to tune software to the machine.

There are 6 separate cache miss signals monitored by the instrumentation in instruction sampling mode. These signals are each held in a cache miss latch 444–454. Each latch is clocked by the appropriate IID 24 Data Cache Access Valid line (generated by the instrumented CPU). The latches of the type that once set, remain so until reset (i.e. set/reset latches). The cache miss latches 444–454 are reset by the IID 24 decode signal. The cache miss signals generated by the CPU are:

a. Data Cache Store Miss (clocked into the C6 latch 454 by the IID 24 Data Cache Store Valid signal on line 456).

b. Data Cache Fetch Miss (clocked into the C5 latch 452 by the IID 24 Data Cache Fetch valid signal on line 458).

c. Access Register Segment Table Origin (STO) Miss (clocked into the C1 latch 444 by the IID 24 access register STO Hit Valid signal on line 460).

d. Access Register STO Hit (clocked into the C2 latch 446 by the IID 24 access register STO MISS Valid signal on line 462).

e. Level 2 Cache (L2) Fetch Miss caused by a Data Cache Miss (clocked into the C4 latch 450 by the IID 24 L2 Cache Access Valid signal on line 464). An L2 cache miss is assumed to cause a main memory access.

f. Caused Cross Interrogate Hit (clocked into the C3 latch 448 by the IID 24 CCI Valid signal on line 466). The CCI signal is raised on a cast out caused in another CPU, by an IID 24 instruction in the instrumented CPU.

3.3 Condition Selection Logic

Selection of the system conditions to be monitored is set into the condition selection logic 302. System conditions are distinguished from system events in that system event signals have only a short duration (e.g. one or two machine cycles) while system condition signals have a longer duration lasting many cycles. A system condition may exist when a system event occurs. The preferred selectable system conditions for instruction sampling are as follows:

Instructions controlling an instrumentation conditioning and control latch (ICCLATCH);
Instruction address within range (IAWR);
Program address space number (PASN) compare;

More than one condition signal can be active. The selected condition signal(s) are sent to the event selection logic 307 where they are logically combined with the event signals. In the preferred embodiment, the ICCLATCH is logically ORed with the IAWR to produce an ICC-OR-IAWR signal.

3.4 Sampling Pulse Trigger Logic

The sampling pulse trigger logic 318 includes the event selection logic 307 and the Nth event control 309. The sampling pulse trigger logic 318 produces a sampling pulse to the ITA address generator on line 310 whenever an IID 24 instruction completes and meets the operator selected event criteria, after the selected event has occurred a selected number of times.

Selection of a particular type of event, or combination of event types (that are to be monitored for triggering a measurement) are set in an event selection logic 307. Various conditions can be interposed in the command. The preferred events used as a precondition to instruction sampling are:

IID 24 instruction decode;
Time Strobe (machine cycles)
Data cache (D cache) store miss;
Data cache (D cache) fetch miss;
Level 2 (L2) cache fetch miss;
Caused cross interrogate (CCI).

Logical combinations of an event with a selected condition from the condition selection logic 302 can also be selected. The preferred selectable logical combinations for instruction sampling are:

Time ANDed with (ICC OR IAWR);
IID 24 instruction decode ANDed with (ICC OR IAWR);
Data cache store miss ANDed with (ICC OR IAWR);
Data cache fetch miss ANDed with (ICC OR IAWR);
L2 cache fetch miss caused by a D cache miss ANDed with (ICC OR IAWR);
IID 24 instruction decode ANDed with PASN compare;
Data cache store miss ANDed with PASN compare;
Data cache fetch miss ANDed with PASN compare;
L2 cache fetch miss caused by a D cache miss ANDed with PASN compare;

The Nth event control block (explained in more detail infra) is used to control the recording of the next IID 24 instruction to complete and meet the selected trigger conditions after a selected event to be counted reaches the selected N value. Selection of a value N for the Nth event control block 309 is performed at the PCE console. As with the commands for the other logic blocks, the selection of N is preferably based on estimated CPU event frequency, so as to fill the respective ITA out buffer with no (or minimum) overrun.

Figure 5A:
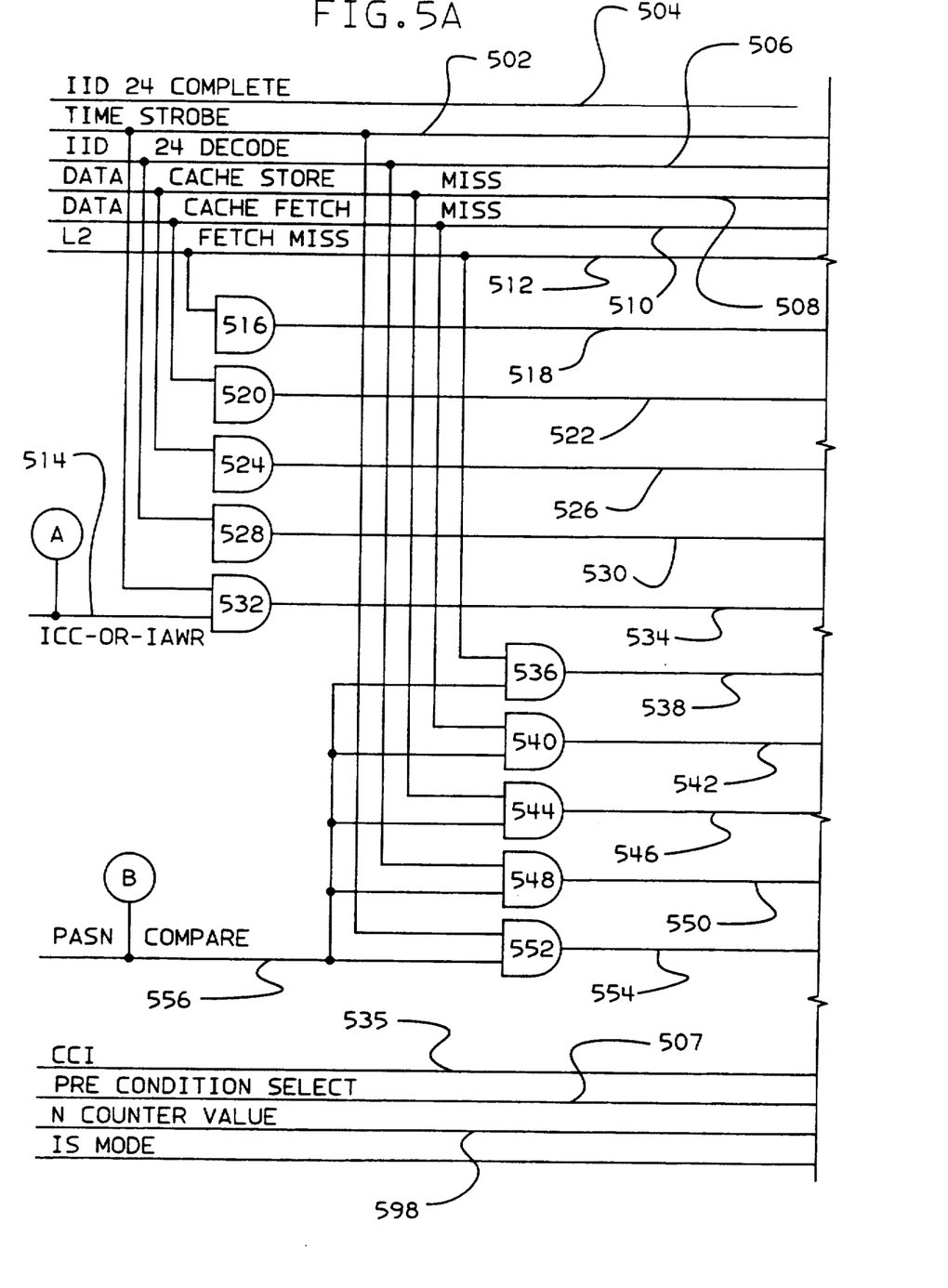
FIGS. 5A and 5B are, respectively, left and right halves of a more diagram of the sampling pulse trigger logic of FIG. 3.
Figure 5B:
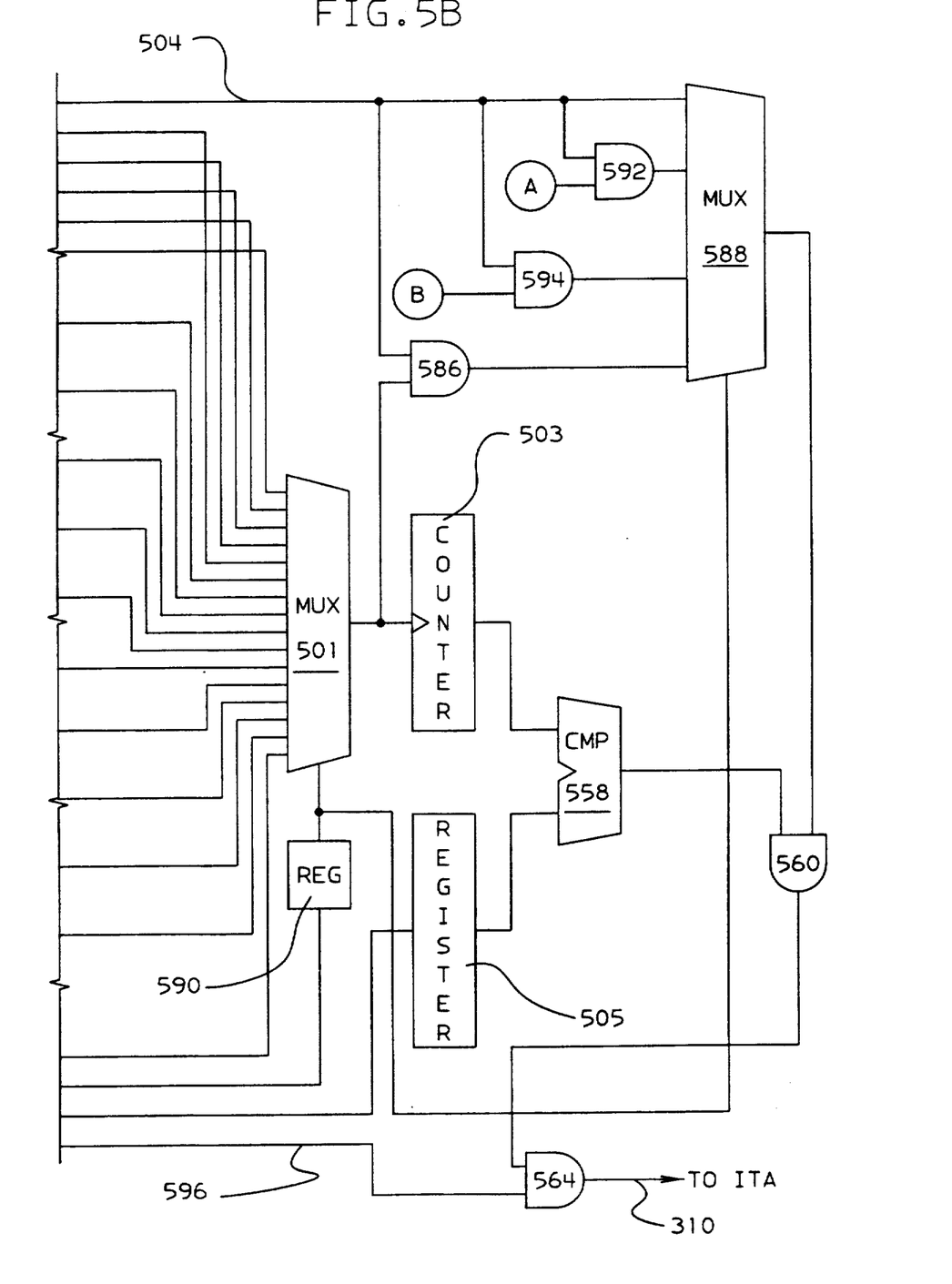

The sampling pulse trigger logic is shown in more detail in FIGS. 5A and 5B. FIGS. 5A and 5B are a conceptual representation of the sampling pulse trigger logic. The essential circuitry of the sampling pulse trigger logic is preferably embodied in a gate array. Like elements in FIGS. 3 and 4 have been assigned like reference numerals.

One of the following trigger conditions (based on events or logical combinations of events and conditions) is specified in a control register 590 of the sampling pulse trigger logic 318 via a command from the PCE 206. The trigger condition select data (from the PCE) appears at the precondition select input (4 bits) 507 of the sampling pulse trigger logic. The precondition select inputs are used to select one of sixteen combinations of events/conditions as a IID 24 store precondition via a 16:1 MUX 501 select. The N threshold value (selected at the PCE console) is set into a threshold register 505 via line 598. It should be understood that the generation of a sampling pulse on line 310 by the sampling pulse trigger logic 318 presupposes that instruction sampling mode has been set at the operator console, thereby setting the IS mode bit on line 596.

A. Time Strobe from Globals

The time strobe signal (line 502) is generated periodically by the SCE 210 (FIG. 2). When selected via the MUX 501, the time strobe signal will increment the binary counter 503 once per time strobe. On the first IID 24 instruction to complete after the value in the binary counter 503 reaches the N value in the threshold register 505, a sampling pulse will be generated on line 310.

B. IID 24 Instruction Decodes

The IID 24 decode signal (line 506) is generated by the CPU instruction decode and IID assignment logic (at block 106, FIG. 1) and strobed (pulsed) whenever a valid Op. Code, in an IID 24 instruction, is decoded. The IID 24 instruction decode signal enters the sampling pulse trigger logic on one of the machine signal lines 31 A to Z. When selected via MUX 501, the IID 24 decode signal will increment the binary counter 503 each time an IID 24 instruction is decoded. On the first IID 24 instruction to complete after the value in the binary counter 503 reaches the N value in the threshold register 505, a sampling pulse will be generated on line 310.

C. Data Cache (D Cache) Store Miss

The latched Data Cache Store Miss Signal (line 508) is taken from the C6 latch 454 (FIG. 4) of the ISI signal collector. As previously described, the C6 latch 454 can be set only once for each IID 24 instruction and is cleared by each new IID 24 decode valid signal (generated by the instrumented CPU). When selected via MUX 501, the latched Data Cache Store Miss Signal will increment the binary counter 503 once for each IID 24 instruction execution that has caused a Data Cache Store Miss. On the first IID 24 instruction to complete during a data cache store miss event, after the value in the binary counter 503 reaches the N value in the threshold register 505, a sampling pulse will be generated on line 310. This mode causes only data associated with the processing of IID 24 instructions that cause data cache store misses to be saved in the Instruction Table Array.

D. Data Cache Fetch Miss

The latched Data Cache (D Cache) Fetch Miss Signal (line 510) is taken from the C5 452 (FIG. 4) of the ISI signal collector. As previously described, the C5 latch 452 can be set only once for each IID 24 instruction and is cleared by each new IID 24 decode valid signal. When selected via MUX 501, the latched Data Cache Fetch Miss Signal will increment the binary counter 503 once for each IID 24 instruction execution that has caused a Data Cache Fetch Miss. On the first IID 24 instruction to complete during a data cache fetch miss event, after the value in the binary counter 503 reaches the N value in the threshold register 505, a sampling pulse will be generated on line 310. This mode causes only data associated with the processing of IID 24 instructions that cause data cache fetch misses to be saved in the Instruction Table Array.

E. Level 2 (L2) Cache Fetch Miss caused by a D Cache Miss (main memory access)

The latched Level 2 Cache Fetch Miss Signal (line 512) is taken from the C4 latch 450 (FIG. 4). As previously described, the C4 latch 450 can be set only once for each IID 24 instruction and is cleared by each new IID 24 decode valid signal. When selected via MUX 501, the latched L2 Cache Fetch Miss Signal will increment the binary counter 503 once for each IID 24 instruction execution that has caused a L2 Cache Fetch Miss). It should be understood that this signal is only meaningful in situations where a data cache miss does not automatically imply a main memory access (such as where there is a level 2 cache present in the system). On the first IID 24 instruction to complete during an L2 cache fetch miss, after the value in the binary counter 503 reaches the N value in the threshold register 505, a sampling pulse will be generated on line 310. This mode causes only data associated with the processing of IID 24 instructions that cause level 2 cache fetch misses to be saved in the Instruction Table Array.

F. Time Strobe And ICC-OR-IAWR

When an ICC or an Instruction Address Within Range (IAWR) condition occurs the instrumented CPU strobes the ICC-OR-IAWR signal (line 514). The ICC-OR-IAWR signal enters the sampling pulse trigger logic 318 on one of the machine signal lines 31 A to Z via the condition selection logic 302. The ICC-OR-IAWR signal is ANDed with the Time Strobe signal 502 at gate 532. When selected via MUX 501, the Time Strobe AND ICC-OR-IAWR signal (line 534) will increment the binary counter 503 once for each Time Strobe where an ICC-OR-IAWR condition is present. On the first IID 24 instruction to complete on a time strobe during an ICCLATCH or IAWR condition, after the value in the binary counter 503 reaches the N value in the threshold register 505, a sampling pulse will be generated on line 310.

G. IID 24 Instruction Decode And ICC-OR-IAWR

The ICC-OR-IAWR signal is ANDed with the IID 24 decode signal 506 at gate 528. When selected via MUX 501, the IID 24 decode AND ICC-OR-IAWR signal (line 530) will increment the binary counter 503 once for each IID 24 instruction decode where an ICC-OR-IAWR condition is present. On the first IID 24 instruction to complete during an ICCLATCH or IAWR condition, after the value in the binary counter 503 reaches the N value in the threshold register 505, a sampling pulse will be generated on line 310.

H. Data Cache Store Miss And ICC-OR-IAWR

The latched Data Cache Store Miss signal is ANDed with the ICC-OR-IAWR signal at gate 524. When selected via MUX 501, the latched Data Cache Store Miss AND ICC-OR-IAWR signal (line 526) will increment the binary counter 503 once for each IID 24 instruction execution causing a Data Cache Store miss event during an ICC-OR-IAWR condition. On the first IID 24 instruction to complete during a data cache store miss event and an ICCLATCH or IAWR condition, after the value in the binary counter 503 reaches the N value in the threshold register 505, a sampling pulse will be generated on line 310.

I. Data Cache Fetch Miss And ICC-OR-IAWR

The latched Data Cache Fetch Miss signal is ANDed with the ICC-OR-IAWR signal at gate 520. When selected via MUX 501, the latched Data Cache Fetch Miss AND ICC-OR-IAWR signal (line 522) will increment the binary counter 503 once for each IID 24 instruction execution causing a Data Cache Fetch miss during a ICC-OR-IAWR condition. On the first IID 24 instruction to complete during a data cache fetch miss event and an ICCLATCH or IAWR condition, after the value in the binary counter 503 reaches the N value in the threshold register 505, a sampling pulse will be generated on line 310.

J. L2 Fetch Miss caused by a D Cache Miss And ICC-OR-IAWR

The latched L2 Fetch Miss signal is ANDed with the ICC-OR-IAWR signal at gate 516. When selected via MUX 501, the latched L2 Fetch Miss AND ICC-OR-IAWR signal (line 518) will increment the binary counter 503 once for each IID 24 instruction execution causing an L2 Cache Fetch miss during an ICC-OR-IAWR condition. On the first IID 24 instruction to complete during an L2 cache fetch miss event and an ICCLATCH or IAWR condition, after the value in the binary counter 503 reaches the N value in the threshold register 505, a sampling pulse will be generated on line 310.

K. Time And PASN Compare

The Program Address Space Number (PASN) compare signal (line 556) is generated by the instrumented CPU when an instruction accesses memory in a preselected primary address space. The PASN compare signal enters the sampling pulse trigger logic 318 on one of the machine signal lines 31A to Z via the condition selection logic 302. The PASN compare signal is ANDed with the Time Strobe signal at gate 552. When selected via MUX 501, the PASN compare AND time strobe signal (line 554) will increment the binary counter 503 once for time strobe occurring during PASN compare condition. On the first IID 24 instruction to complete on a time strobe during a PASN compare condition, after the value in the binary counter 503 reaches the N value in the threshold register 505, a sampling pulse will be generated on line 310.

L. IID24 Instruction decode and PASN Compare

The PASN compare signal is ANDed with the IID 24 instruction decode signal at AND gate 548. When selected via MUX 501, the PASN compare AND IID 24 decode signal (line 550) will increment the binary counter 503 once for each IID 24 instruction decode during a PASN compare condition. On the first IID 24 instruction to complete during a PASN compare condition, after the value in the binary counter 503 reaches the N value in the threshold register 505, a sampling pulse will be generated on line 310.

M. Data Cache Store Miss And PASN Compare

The PASN compare signal is ANDed with the latched Data Cache Store Miss signal 508 at AND gate 544. When selected via MUX 501, the PASN compare AND latched Data Cache Store Miss signal 546 will increment the binary counter 503 once for each IID 24 instruction execution causing a Data Cache Store Miss event during a PASN compare condition. On the first IID 24 instruction to complete during a data cache store miss event and PASN compare condition, after the value in the binary counter 503 reaches the N value in the threshold register 505, a sampling pulse will be generated on line 310.

N. Data Cache Fetch Miss And PASN Compare

The PASN compare signal is ANDed with the latched Data Cache Fetch Miss signal 510 at AND gate 540. When selected via MUX 501, the PASN compare AND latched Data Cache Store Miss signal (line 542) will increment the binary counter 503 once for each IID 24 instruction execution causing a Data Cache Fetch Miss during a PASN compare condition. On the first IID 24 instruction to complete during both a data cache fetch miss event and a PASN compare condition, after the value in the binary counter 503 reaches the N value in the threshold register 505, a sampling pulse will be generated on line 310.

O. L2 Fetch Miss caused by a D Cache Miss And PASN

The PASN compare signal is ANDed with the latched L2 Cache Fetch Miss signal 512 at AND gate 536. When selected via MUX 501, the PASN compare AND latched L2 Cache Fetch Miss signal (line 538) will increment the binary counter 503 once for each instruction causing an L2 Cache Fetch Miss during a PASN compare condition. On the first IID 24 instruction to complete, and during both an L2 cache fetch miss event and a PASN compare condition, after the value in the binary counter 503 reaches the N value in the threshold register 505, a sampling pulse will be generated on line 310.

P. Caused Cross Interrogate

The Caused Cross Interrogate signal (CCI) (line 535) is generated by the instrumented CPU. The CCI signal enters the sampling pulse trigger logic 318 on one of the machine signal lines 31A to Z. When selected via MUX 501, the CCI signal 356 will increment the binary counter 503 once for each IID 24 instruction causing a CCI condition. On the first IID 24 instruction to complete during a CCI condition, after the value in the binary counter 503 reaches the N value in the threshold register 505, a sampling pulse will be generated on line 310. This mode causes only data associated with the processing of IID 24 instructions that cause CCI events to be saved in the Instruction Table Array.

In the embodiment of FIGS. 5A and 5B, only the events above are allowed in the 'N' events to be counted prior to the captured IID 24 data (i.e. the data registered or counted in the ISI signal collector 304) being stored.

The logic for processing the first IID 24 to complete after the Nth event counter has reached the preselected value will now be explained by reference to FIGS. 5A and 5B. The IID 24 complete signal serves as a first input to a 4:1 MUX 588 (the event MUX). The IID 24 complete signal is ANDed with the selected event signal (from MUX 501) at an AND gate 586 (the event AND gate) and provides a second input to the event MUX 588. The IID 24 complete signal is additionally ANDed with the ICC-OR-IAWR signal at gate 592 and the PASN compare signal at gate 594. The outputs of AND gates 592 and 594 provide third and fourth inputs to the event MUX 588. The output of the event MUX 588 is ANDed with the output of the comparator 558 at AND gate 560. When the comparator 558 detects that the count in the binary counter 503 is equal to the count in the N register 505 (as preset by the PCE), the output of the comparator 558 will go to the high (true) state.

When the Time Strobe is the selected trigger condition, the event MUX 588 selects the IID 24 complete input. When the instruction sampling mode bit is set (at the output AND gate 564), the next IID 24 instruction to complete, after the time strobe count in the binary counter 503 reaches the value in the precondition register 505, will cause a sampling pulse to occur on line 310.

When the IID 24 instruction decode AND ICC-OR-IAWR is the selected trigger condition, the event MUX selects the output of AND gate 592. The counter 503 maintains the count of IID 24 instruction decodes occurring during an ICC-OR-IAWR condition. When the instruction sampling mode bit is set, the next IID 24 instruction to complete during an occurrence of the ICC-OR-IAWR condition, after the the count in binary counter 503 reaches the preset threshold in the precondition register 505, will cause a sampling pulse to occur on line 310.

When the PASN compare AND IID 24 decode is the selected trigger condition, the event MUX selects the output of AND gate 594. The counter 503 will maintain the count of IID 24 instruction decodes occurring during a PASN compare condition. When the instruction sampling mode bit is set, the next IID 24 instruction to complete during an occurrence of the PASN condition, after the the count in binary counter 503 reaches the preset threshold in the precondition counter 505, will cause a sampling pulse to occur on line 310.

When a trigger condition other than Time Strobe, ICC-OR-IAWR AND IID 24 complete, or PASN compare AND IID 24 complete is selected, the event MUX 588 selects the output of AND gate 586. When the instruction sampling mode bit is set (at the output AND gate 564), the next IID 24 instruction to complete during the occurrence of the selected event, after the count in the binary counter 503 reaches the desired count in the precondition counter 505, will cause a sampling pulse to occur on line 310.

The counter 503 is reset by the occurrence of a sampling pulse on line 310.

3.5 The ITA and ITA Address Generator

The ITA 32 is a memory array whose purpose is to store the data captured in the ISI signal collector. When a monitored IID 24 instruction completes and meets the selected trigger condition, the associated, captured data from the ISI signal collector is stored in the ITA as a single instrumentation entry.

The ITA 32 is preferably organized into two independently addressable sections 32A, 32B. The array should be wide enough to hold all signals of interest in instruction sampling. More preferably, the array should be wide enough to further accommodate any other signals which would be of interest in other monitoring modes. This later embodiment enables the same array to be used by different modes or types of instrumentation. Separate arrays are preferably provided for diagnostic and performance instrumentation.

The output buffer control for instruction sampling is as follows:

There are two table address counters (TACs) in the ITA address generator. A write TAC 332 is used to supply entry addresses to the ITA for writing of data from the ISI signal collector. The read TAC 331 is used to supply entry addresses for reading data from the ITA to the PCE storage. In the preferred embodiment, there is one TAC address bus 336 and reads are enabled only when a write to the ITA is not in progress. When a sampling pulse is received by the ITA address generator 33 on line 310 (and the ITA is not write inhibited as described below), it causes the ITA address generator 33 to enable the ITA for the storing of an instruction sample (from the ISI signal collector 304) at the current address indicated by the write TAC 332.

When the first half 32A of the ITA is full (indicated by the write TAC 332 having been incremented to point to the 64th entry), a first-half full bit is set in an ITA status register 333 within the ITA address generator 33. Similarly, when the second half 32B of the ITA is full (indicated by the write TAC 332 having been incremented to point to the 128th ITA entry) a second-half full status bit bit is set in the ITA status register. When both halves of the ITA are full, writes to the ITA from the ISI signal generator are inhibited by the ITA address generator. If a sampling pulse on line 310 is received by the ITA address generator when both halves of the array are full, the ITA address generator sets an overrun bit in the ITA status register.

There is one overrun bit for each half of the ITA. The bit set will depend on the address of the write TAC during the inhibited write. If the write TAC is pointing to the first half 32A of the array during the inhibited write, a first-half overrun status bit will be set, if the TAC is pointing to the second half of the ITA during the inhibited write, a second-half overrun status bit will be set.

The ITA status register 333 is read by the PCE (via path 338) prior to initiating a read from the ITA. If the status register indicates an overrun, it is reported to the instrumentation control program so that the instrumentation user can be aware that data has been lost and can analyze the significance of that fact. As an alternative embodiment, the ITA address generator can include an overrun counter and the number of overruns can be reported as part of the ITA status.

On command of the PCE, the read TAC 331 in block 33 provides the read address to the ITA on its address bus 336. The PCE uses the array full status to determine which half of the array to read. As previously indicated, the ITA reads occur in between ITA write operations. When the PCE has read the complete ITA half, it commands the ITA address generator 33 to reset the overrun and array full status bits associated with that half of the ITA and to release that ITA half for writing from the ISI signal collector.

As an alternative embodiment, the ITA address generators can use the TACs to read and write to the array halves in conventional double buffer fashion. As yet a further alternative embodiment a single TAC can be used as described in U.S. Pat. No. 4,821,178. If the ITA address generator uses only one TAC counter for both ITA input addressing and output addressing, the CPU signals received by the ITA gates 31 are stored in the ITA only if: 1) A trigger signal (sampling pulse) on line 310 is provided from Nth event control 309, and 2) the ITA input is not locked while the TAC in the address generator 33 outputs the filled ITA content to its output buffer.

In order to enable the PCE to read a variety of combinations of data from the array, the instrumentation entries are read from the ITA 33 in couplets (groups of two bytes). Each of the couplets is independently addressable by the PCE via a multiplexer (MUX) 316 (i.e. bits 0–15 is one couplet 16–31 another, etc.). The multiplexer 316 can be used to select any one couplet of the ITA 32 (in one PCE read cycle) directly via select data provided to the MUX 316 (on path 312) from the PCE via the PCE command decoder 34.

Path 314 provides the ITA address to an SAT address controller (not shown) of the type disclosed in the internally distributed monitoring system of U.S. Pat. No. 4,590,550. Conventional trace and SAT gating logic (not shown) of the type disclosed in U.S. Pat. No. 4,590,550 (FIG. 2, reference numerals 35,35B,36,36A) are provided and connected to the Instruction Sampling Recorder in a conventional manner.

Storing in an ITA entry can only occur at the instant when a sampling pulse is provided on line 310, so that each sample inputted into the ITA 32 corresponds to a single occurrence of the IID 24 that meets the selected trigger conditions.

4. Operational Summary

The operation of the instruction sampling instrumentation will now be summarized by reference to FIG. 2. The measurement control command signals are sent on bus 51 from the PCE to each ITU. A command path 151 is received by the PCE command decoder 34 (FIG. 3) which generates and outputs control signals on busses 301, 312 and 318. As previously mentioned, both the command and data paths 151, 251 are actual implemented as a single bidirectional PCE bus 51. The control signals set up the controls in the ITU, as previously described. The operation of the instruction sampling instrumentation and selection settings are summarized as follows:

A. The instrumentation mode is set in the instrumentation mode selection block 300 to instruction sampling mode. (In instruction sampling mode sampling mode, time-sampling input pulses received on line 55 are inhibited from reaching the CPU ITU.).

B. The condition selection logic 302 is set to select the condition(s) that will be active during the measurement run.

C. The event selection logic 307 is set to select an event, or combination of event(s) or condition(s).

D. The Nth event control block 309 is set to the value N. This sets the threshold value in control register 505 for the counter 503 in block 309 to the value N. Using this counter, the sampling pulse trigger logic outputs a sampling pulse to the ITA address generator on the first IID 24 complete signal (passed from the machine signals 31 A to Z through the condition selection logic 302) to occur and meet a selected trigger condition, after each Nth occurrence of the selected trigger condition. In this manner, only data associated with the first IID 24 instruction to complete during the occurrence of a selected event, after each Nth occurrence of the selected event will be recorded in ITA 32.

E. The ISI signal collector 304 is set for selecting which of the event signals will be latched for enabling their data collection in the ITA. (This primes a path for selected data to pass from the CPU into the instruction table array upon occurrence of a sampling pulse from block 309.)

F. Optionally, an overrun threshold can be set in the PCE for termination of the measurement if successive overruns occur.

At a subsequent time (set by an operator command) the actual measurement begins. This means that selected machine state signals on lines 31 A to Z will now be registered in the ISI signal collector block 304 for recording in the ITA 32 at an ITA address selected by ITA address generator 33 after the occurrence of each sampling pulse from block 309.

When any signal occurs on lines 31 A to Z that is selected for a sampling operation, the signal is sent to the ITU's instruction sampling instrumentation (ISI) signal collector 304 from the CPU source where it occurs. The collector 304 latches each selected event signal and forwards it to other areas of the ITU, specifically:

1. To the event selection logic 307 to determine whether this signal is to be used for sampling.
2. To the data inputs of the ITA 32 on bus 311 where the selected signal is can be recorded in the current ITA entry as the data being collected.

The condition signal bus 303 passes the condition signals, and bus 305 passes some of the event signals to the condition selection block 302, where condition specifications were set under command control. In block 302, the signals are tested, and if selected they are latched for the measurement run. The latch is outputted on line 306 to the event selection logic 307 if the selected condition was signalled by the CPU.

In event selection block 307, selected signals are checked for a match against the trigger conditions previously specified from command path 301 during instrumentation initialization. When a selected signal match is found in block 307, an output pulse forwarded on path 308 to the Nth event control block 309.

In Nth event controls 309, the counter (CTR) is incremented by each occurrence of the event selected for measurement. As explained supra, the selected event can be a system event or a logical combination of a system event and a system condition. Each time the incremented counter reaches value N, on the next IID 24 instruction to complete and meet the selected trigger conditions, a sampling pulse is outputted on path 310 to the ITA address generator 33 on the next IID 24 to complete. This enables the recording in the ITA of the selected set of signals in the latched set provided from the ISI signal collector 304. The counter is reset to zero each time an IID 24 instruction is decoded by the monitored CPU.

A read table address counter (TAC) in the ITA address generator 33 is incremented by each sampling pulse on line 310 (TAC is a 7-bit counter for an ITA data array having 128 entries). The ITA array will preferably have sufficient holding capacity to avoid overruns under normal measurement circumstances.)

The address incrementing logic of the ITA address generator may be the same for other instrumentation modes. However, as mentioned above, instruction sampling mode (unlike time sampling mode) is inherently asynchronous between CPU's, so that output control for the ITA is different for instruction sampling mode than for time mode sampling.

As noted, instruction sampling can be made conditional on the current instruction address falling within a given range, IAWR (e.g., the PER registers in the IBM System 370 implementation); or on a special latch (ICCLATCH) in block 302 (but now shown) having been set by special state instructions (e.g., diagnose or SIE) placed in the code being measured in order to signal entry to and exit from routines of interest. Condition control allows another dimension of selectivity, in that sampling can be restricted by address range or dynamically turned on and off under program control or certain CPU states or CPU model dependencies.

The recording of instruction sampling signals in the ITA 32 can be throttled by the setting of N. For frequent events, recording only on the first IID 24 instruction to complete during a selected event, after an Nth occurrence of the event, is necessary to avoid filling the ITA faster than its recorded content can be moved into its output buffer to prevent buffer overrun.

When the CPU state data is sampled at fixed intervals (i.e., time sampling) and recorded for later analysis (to study the interaction between programs and computer structure, and other performance relationships), a problem may exist that some events happen at rates that are difficult to sample, either because they are so frequent that the demanded recording data rates are higher than feasible to record the number of samples taken, or because they happen so seldom and over a very short duration that a large number of samples must be taken over a very long period of time to get a statistically meaningful number of samples that include the event of interest.

Hence, event driven instruction sampling captures the state of the machine during execution of an IID 24 instruction which completes and during the occurrence of a selected event after a selected number of occurrences of the selected event. In other words, in instruction sampling mode, sampling is not done at arbitrary timer intervals, but only whenever an IID 24 instruction completes during the course of a selected event (e.g. a selected system event, system condition, or logical combination thereof) after the selected event has occurred a selected number of times. Multiple sub-elements of the processor can participate in an instruction sampling run.

The measurement operations for an ITU during event sampling are eventually terminated according to the commands which specified the measurement.

The data flow in the CPU involves its various sub-elements that forward instrumentation data through lines 31A to 31Z as the machine signal interface to the ITU. These data signal inputs are the same for instruction sampling mode as they are for other sampling modes, except that for instruction sampling the event-related signals are forwarded via paths 303, 305 and 311A for the processing of selected event(s)/condition(s) into recording samples.

The PCE activity during system measurement controls the operation of the associated out buffer. The PCE monitors each out buffer and causes it to be written to tape or other mass storage device when full. The PCE also logs a count of overruns of each ITA. Overruns indicate data loss; and depending on their frequency, overruns may affect the measurement accuracy of a run. If the user has specified an overrun threshold as a particular number of overruns, a measurement run may be terminated if the overrun threshold is reached.

5. IID Assignment—Instruction Sampling Considerations

One consideration in using instruction is the handling of interrupts by the Central Processor. In some out-of-sequence processors, the occurrence of an interrupt may cause the IID assignment logic to assign an IID of 0 to the interrupted instruction. The IID assignment logic would then need to begin reassigning sequential IIDs to the interrupt handler instructions. One possible IID assignment sequence is as follows:

12345.0.12345 . . .

In the above example, the first "12345" is the sequence of IIDs assigned to a stream of instructions. The "0" is the IID assigned to the interrupted instruction, and the second "12345" are the first five IIDs assigned to the interrupt handler instructions.

The above scheme is not well suited for instruction sampling Because the IID assignments return to "1" for the first instruction of the interrupt handler a true random sample will not be obtained. Using the above assignment method, the same instruction in the interrupt handler will be tagged with the same every time. If, for example, every IID 24 was being sampled, only one sequence of instructions (every 24th one) in the interrupt handler would ever be seen by the instrumentation.

There are many solutions to this non-randomization. One such solution would be to have the IID assignment pick up at the last IID number prior to the interrupt as follows:

12345.0.56789 . . .

Similarly, the IID assignment could pick up at the next number as shown below:

12345.0.6789A . . .

As an alternative solution, the interrupted instruction could be assigned an in sequence IID number such as:

12345.6.789AB . . .

The point of the above solutions is to keep the sampling randomized as to interrupt handler instructions.

6.0 Variations and Improvements

The foregoing description of the preferred embodiments of the invention have been provided for the purposes of example and description. Those skilled in the art will understand that there are many variations and modifications to the described embodiments that fall within the spirit and scope of the invention. For example, any other instruction IID could be identified and used as a basis for instrumentation in the place of IID 24. Further, different instrumentation, monitoring different Central Processors in the same system, could monitor the execution of instructions having different IIDs.

It is intended that the scope of the invention be limited only by the claims.

Having thus described out invention, what we declare as new and desire to secure by Letters Patent is:

1. An apparatus for monitoring execution of instructions in an out-of-sequence execution machine of a type that tags each instruction in an execution pipeline with an instruction identification number, comprising:

a memory;

first detection means for detection processing by said machine, of an instruction having a preselected instruction identification number;

temporary storage for capturing data associated with the processing of said instruction having said preselected instruction identification number, said temporary storage means being in communication with and responsive to said first detection means;

second detecting means for detecting a signal from said machine indicating that said machine has completed execution of said instruction having said preselected instruction identification number; and trigger means, in communication with said second detecting means, said temporary storage means and said memory, for causing said data captured in said temporary storage means to be stored in said memory responsive to completion of execution of said instruction having said preselected instruction identification number, wherein, only data associated with processing of completed ones of said instructions having said preselected instruction identification number is captured in said memory.

2. The apparatus of claim 1 wherein said memory comprises two independently addressable sections, and further comprising:

a command decoder;

first address generator means for generating a write address for said memory;

first address generator means for generating a read address for said memory in response to a decoded command; and multiplexor means, responsive to said decoded command for reading a selected portion of a data entry at said read address;

said multiplexor means being in communication with said memory and said command decoder;

said first and second address generator means being in communication with said memory through a command data path;

said second address generator means being in communication with said command decoder.

3. An apparatus for monitoring execution of instructions in and out-of sequence execution central processor, comprising:

a memory;

a plurality of registers coupled to said memory and disposed to receive machine signals from the central processor, each of said registers being clocked by a validity signal indicating that said machine signals received by said register having occurred during processing of an instruction having a preselected instruction identity number;

sampling pulse trigger logic in communication with said central processor and disposed to receive a completion signal from the central processor indicating that said central processor has completed execution of said instruction having said preselected instruction identity number, said sampling pulse trigger logic comprising, (a) means for receiving data indicating an occurrence of a plurality of events in said central processor;

(b) means for selecting any of said events;

(c) means for generating a sampling pulse when said completion signal has been received and said selected event has occurred;

memory control means in communication with said memory and said sampling pulse trigger logic, for causing said contents of said registers to be written to said memory responsive to a sampling pulse from said sampling pulse trigger logic, wherein aid machine signals received by said registers are transferred to said memory only in condition that said instruction having said preselected instruction identity number has completed execution and that said selected event has occurred.

4. A method for monitoring execution of instructions in an out-of-sequence execution machine of a type that tags each instruction in an execution pipeline with an instruction identification number, comprising the steps of:

(a) detecting means for detecting processing by said machine, of an instruction tagged with a preselected one of said instruction identification numbers;

(b) capturing data associated with the processing of said instruction having said preselected one of said instruction identification numbers detected instep (a);

(c) detecting a signal from sad machine indicating that said machine has completed execution of said instruction having said preselected one of said instruction identification numbers detected in step (a); and (d) storing said data captured in step (b) in a table. on condition that said completion of execution of said instruction having said preselected one of said instruction identification numbers is detected is detected in step (c).

5. The method of claim 4 further comprising the step of:

(e) detecting an occurrence of a preselected event in said machine, wherein said storing of step (d) is further conditioned on the occurrence of said preselected event detected by step (e).

6. A method for monitoring execution of instructions in an out-of-sequence execution machine of a type in which each instruction in an execution pipeline is tagged with a sequentially assigned instruction identification number, comprising the steps of:

(a) detecting means for detecting processing by said machine, of an instruction tagged with a preselected one of said instruction identification numbers;

(b) capturing data associated with the processing of said instruction having said preselected one of said instruction identification numbers detected in step (a);

(c) detecting a signal from said machine indicating that said machine has completed execution of said instruction having said preselected one of said instruction identification numbers detected in step (a);

(d) discarding said data captured in step (b) if completion of execution of said instruction having said preselected one of said instruction identification numbers is not detected in step (c); and, (e) storing said data captured in step (b) in a table, on condition that said completion of execution of said instruction having said said preselected one of said instruction identification numbers is detected in step (c).

7. The method of claim 6 further comprising the step of:

(f) detecting an occurrence of a preselected system condition in said machine, wherein said storing of step (e) is further conditioned on the occurrence of said preselected system event detected by step (f).

* * * * *